Mar. 6, 1923.
A. SOKOLA.
MOUSE AND RAT TRAP.
FILED APR. 1, 1922.
1,447,491.
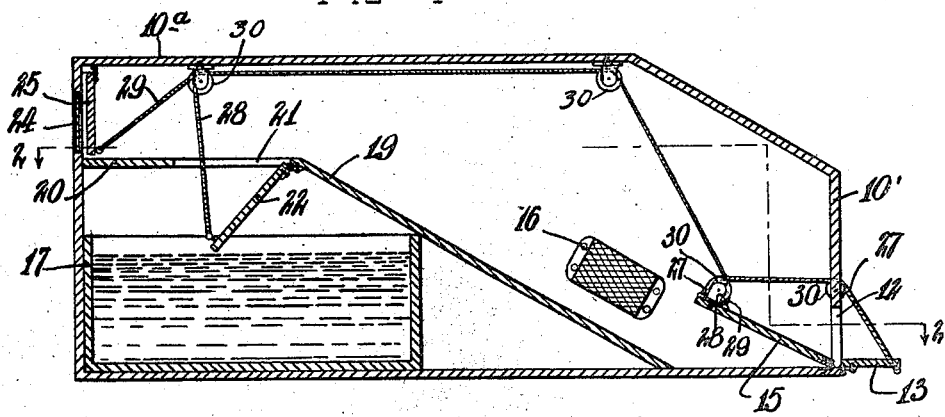
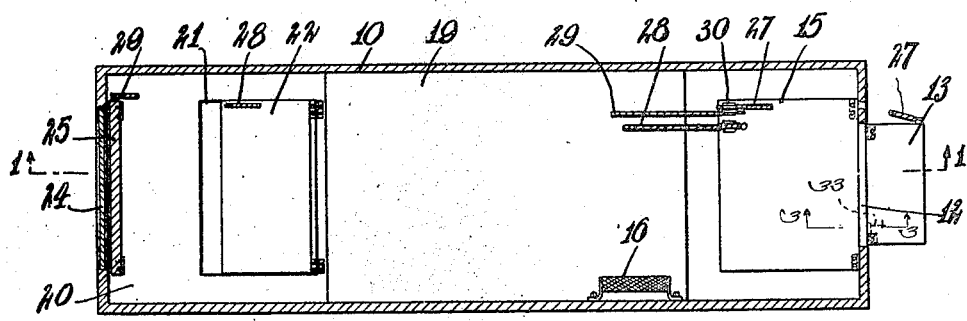
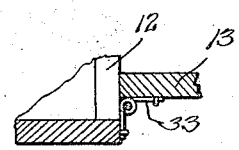
Inventor
Anton Sokola
By Zoltan Polachek
Attorney Patented Mar. 6, 1923.

1,447,491

UNITED STATES PATENT OFFICE.

ANTON SOKOLA, OF ST. PAUL, MINNESOTA.

MOUSE AND RAT TRAP.

Application filed April 1, 1922. Serial No. 548,685.

*To all whom it may concern:*

Be it known that I, ANTON SOKOLA, a citizen of Hungary, residing at St. Paul, in the county of Ramsey and State of Minnesota, have invented certain new and useful Improvements in Mouse and Rat Traps, of which the following is a specification.

This invention relates to animal traps, such as are used for catching rats, mice, or other animals the destruction of which may be desirable.

The invention has for an object the provision of a novel and improved trap of this kind.

For further comprehension of the invention, and of the objects and advantages thereof, reference will be had to the following description and accompanying drawings, and to the appended claim in which the various novel features of the invention are more particularly set forth.

Fig. 1 of the drawings is a longitudinal vertical sectional view of an animal trap constructed according to my invention, this view being taken on the line 1—1 of Fig. 2.

Fig. 2 is a horizontal sectional view of the trap taken on the line 2—2 of Fig. 1.

Fig. 3 is a fragmentary longitudinal vertical section taken on the line 3—3 of Fig. 2.

As here embodied my improved trap comprises a box like cage or structure 10 having solid walls. In the front wall of the trap, indicated specifically at 10', is an opening 12 to the lower edge of which is hinged a door 13 adapted to open outwardly. Hinged on a common axis with the door 13 is a platform 15 which extends inwardly into the trap from the opening 12 and is normally inclined upwardly and inwardly as shown. Just to the rear of the platform 15 the bait, indicated at 16, is fixed, and may be protected by a suitable wire caging, the bait preferably used being flour baked in animal fat.

Within the rear end of the trap 10 is located a tank 17 which may be of about half the height of the trap and rest on the floor thereof, this tank being adapted to contain water, or any suitable liquid; into which the animal falls. Extending upwardly and rearwardly from a point near the front end of the trap is an inclined runway 19 which leads over the tank 17 as shown and communicates with a horizontal partition element 20 extending across the trap above the tank. In this partition element is an opening 21 closed by a trap door 22 hinged on the side thereof nearest the entrance of the trap.

In the rear end wall of the trap, between the partition 20 and the top 10ª is a window 24 which is adapted to be closed by a door 25 hinged at its upper edge in the trap and normally hanging across the window opening, this door being adapted to swing inwardly to open position.

The various doors, and the platform 15, are connected together to have a unitary operation as follows: From the free edge of the door 13 at the entrance opening a cord 27 leads backward and connects to the free end of the platform 15, and from said free end of the platform a pair of cords 28 and 29 respectively, lead to the trap door 22, and light obscuring door 25. These various cords lead around suitable pulleys indicated at 30, the cord 27 passing through a suitable aperture in the wall 10' in which one of the pulleys may be mounted.

Normally the various parts occupy the position shown in Fig. 1 of the drawings, the entrance door being open and the light obscuring door closed. When an animal enters the opening 12, being attracted by the bait 16, he walks up the inclined platform 15. The weight of the animal causes this platform to fall to a horizontal position and in so doing it closes door 13 and opens door 25. It will be understood of course that the parts will be so arranged that a relatively small movement of platform 15 will move the said doors through areas of ninety degrees.

When door 25 opens, the animal is attracted by the light shining through window 24 and walks up the inclined runway 19 and onto the trap door 22. As the latter falls under the weight of the animal it pulls cord 28 and raises the platform 15, freeing also the cords 27 and 29 and permitting the doors 13 and 25 to swing to closed and open positions respectively, thus automatically resetting the trap. To ensure of the door 13 opening a light spring 33 may be coiled around one of the hinge pintles and engaged therewith in a well known manner to be tensioned when the door is swung to closed position. The animal, as will be understood falls into the liquid in tank 17 and is drowned.

Having thus described my invention what

I claim as new and desire to protect by Letters Patent of the United States is as follows:

An animal trap comprising an elongated cage having an entrance opening in the front wall thereof, an outwardly opening door hinged at its lower edge for closing said opening, an upwardly and rearwardly inclined platform hinged to the floor of the cage adjacent the said opening, said platform being of considerably greater length from its hinge to its free edge than the said door, an inclined runway leading upwardly and rearwardly from the bottom of the cage with its front end adjacent the rear edge of said platform, and terminating at its rear end in a horizontal partition, a tank in said cage under said partition, a hinged trap door in said partition, and cords connecting said platform with said end door and said trap door whereby depression of said platform closes both of said doors, and depression of said trap door raises the platform and permits the end door to open.

In testimony whereof I have affixed my signature.

ANTON SOKOLA.